(12) United States Patent
Arrojula et al.

(10) Patent No.: US 12,506,852 B2
(45) Date of Patent: Dec. 23, 2025

(54) DETECTING EQUIRECTANGULAR PROJECTION IN 360-DEGREE IMAGES

(71) Applicant: Samsung Electronics Co., Ltd., Suwon-si (KR)

(72) Inventors: Sambu Arrojula, Santa Clara, CA (US); Mallikarjun Swamy, Sunnyvale, CA (US); Aamer Khani, Dublin, CA (US); Siva Boggala, San Ramon, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/948,463

(22) Filed: Nov. 14, 2024

(65) Prior Publication Data

US 2025/0260796 A1 Aug. 14, 2025

Related U.S. Application Data

(60) Provisional application No. 63/552,475, filed on Feb. 12, 2024.

(51) Int. Cl.
*H04N 13/161* (2018.01)
*H04N 13/00* (2018.01)

(52) U.S. Cl.
CPC ... *H04N 13/161* (2018.05); *H04N 2013/0074* (2013.01)

(58) Field of Classification Search
None
See application file for complete search history.

(56) References Cited

U.S. PATENT DOCUMENTS

| | | |
|---|---|---|
| 10,855,916 B2 | 12/2020 | Suitoh |
| 11,284,089 B2 | 3/2022 | Hanhart |
| 11,438,506 B2 | 9/2022 | Kim |
| 2018/0020202 A1 | 1/2018 | Xu |
| 2018/0152663 A1* | 5/2018 | Wozniak ............ G06T 3/12 |
| 2018/0288356 A1* | 10/2018 | Ray ................ H04N 19/124 |
| 2018/0316908 A1* | 11/2018 | Chernobieff ......... H04N 13/275 |
| 2018/0338160 A1* | 11/2018 | Lee ................ H04N 13/117 |
| 2019/0089897 A1* | 3/2019 | Bezares Sánchez ........ H04N 23/698 |
| 2020/0413031 A1* | 12/2020 | Khani ............ G06F 3/0488 |
| 2023/0308630 A1* | 9/2023 | Delgado .......... G06F 3/04842 |

* cited by examiner

*Primary Examiner* — Mohammad J Rahman

(57) ABSTRACT

In one embodiment, a method includes accessing an image file representing a 360-degree image of a scene and determining, from the image file, a stretch factor that identifies to a relative change of adjacent pixels in at least one of (1) an upper row of pixels or (2) a lower row of pixels. The method further includes determining, from the image file, an edge similarity that identifies a change between pixels in a first column and pixels in a last column and determining, based on the stretch factor and on the edge similarity, whether the 360-degree image was encoded using an equirectangular projection and then rendering the 360-degree image based on the equirectangular-projection encoding.

20 Claims, 3 Drawing Sheets

DETECTING EQUIRECTANGULAR PROJECTION IN 360-DEGREE IMAGES

PRIORITY CLAIM

This application claims the benefit under 35 U.S.C. § 119 of U.S. Provisional Patent Application No. 63/552,475 filed Feb. 12, 2024, which is incorporated by reference herein.

TECHNICAL FIELD

This application generally relates to detecting equirectangular projection in 360-degree images.

BACKGROUND

Cameras can capture non-planar images of a scene. For example, one or more cameras may capture multiple images of a scene, and overlap between the images may be used to stitch the images into a single image, or into a single representation of the scene (e.g., a view that a user can navigate seamlessly around). For example, two or more cameras may capture images of a scene from different perspectives, thereby capturing some three-dimensional information about the scene. In addition, certain lenses, such as a fisheye lens, may capture a wide-angle view (e.g., up to a 360-degree view) of a scene, and such images are not in a planar format (e.g., such images may represent spherical information).

A projection is typically used to convert image content captured by one or more cameras to a file format that can be encoded and decoded, e.g., by a video player. For example, a file may store image information as an n by n matrix, with each element corresponding to information about an image pixel (e.g., the RGB values of a pixel in the image).

DESCRIPTION OF EXAMPLE EMBODIMENTS

Many projections exist for converting image information into a 2D texture represented by an image file. Equirectangular projections are some of the most common projections used, and this projection maps the yaw and pitch of non-planar image content (e.g., of 360-degree image content) to a rectangular plane. However, because many projection types exist, an image player (e.g., a player for decoding the image file and recreating the image to display on a display screen) does not necessarily know that an equirectangular projection was used to create the image file the player is operating on, as projection-type metadata is typically not included in the image file. User input is often required to specify the projection used to create one or more image files, but users also often do not know the projection type used to encode image content. Machine-learning models can analyze image files to predict a projection type that was used to create that image file, but such models are computationally expensive to train, store, and run.

In contrast, this disclose describes lightweight computer-vision techniques that can detect when equirectangular projection was used to create a 360-degree image file, thereby ensuring that a player can use the proper settings to accurately decode and re-create images from the image-file contents.

Figure 1:
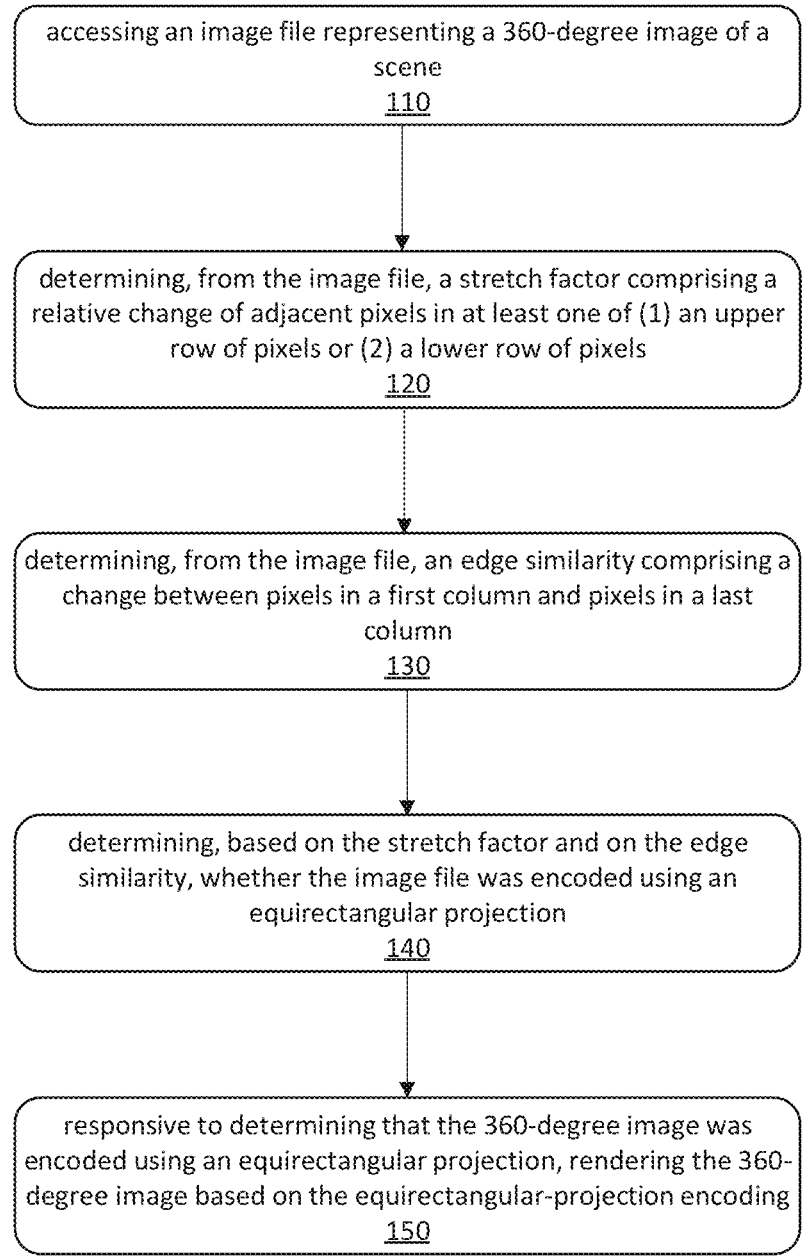
FIG. 1 illustrates an example method for detecting whether equirectangular projection was used to encode a 360-degree image.

FIG. 1 illustrates an example method for detecting whether equirectangular projection was used to encode a 360-degree image. Step 110 of the example method of FIG. 1 includes accessing an image file representing a 360-degree image of a scene. The 360-degree image of the scene may be a single 360-degree image of the scene (e.g., taken by a fisheye lens), or may be an image of the scene stitched together from images taken by two or more cameras oriented in different directions. The image of the scene may be an image frame in a video that is made up of a sequence of images. In particular embodiments, the method of FIG. 1 may be performed by a media player, e.g., by a player that decodes image content from one or more constituent image files and outputs the image content for display, e.g., on a display of a smartphone, a TV, a tablet, a personal computer, etc.

Step 120 of the example method of FIG. 1. includes determining, from the image file, a stretch factor that includes a relative change of adjacent pixels in at least one of (1) an upper row of pixels or (2) a lower row of pixels. The equirectangular projection tends to stretch content at the upper and lower edges of the rectangular image-projection plane. In addition, the rightmost and leftmost image columns of a 360-degree image that is encoded using the equirectangular projection should be similar because those columns represent the same content in the scene, even though they are at opposite sides of the planar image after equirectangular projection.

The stretch factor may be based on the mean change of adjacent pixels in the upper (or lower) row, or may be based on the media change of those adjacent pixels in their respective rows. For example, an image file may represent an image as an n by m set of pixels, where n refers to the number of rows of pixels and m refers to the number of columns of pixels identified in the image file. The upper row refers to the top band of rows, which may be a single row (i.e., the topmost row) or the i topmost rows (e.g., the top 5 rows). The lower row may likewise be the lowermost row or a lower band of rows. The remaining pixel rows of the image are those rows that are not part of either the upper band of rows or the lower band of rows.

The difference between adjacent pixels is based on the pixel information, e.g., when pixels are encoded using RGB encoding then the pixel difference is determined from the difference in RGB values between adjacent pixels, although other pixels encodings may be used. Step 120 includes determining, for a given row, the difference between the first pixel and the second pixel in that row; the difference between the second pixel and the third pixel in that row; and so on, to arrive at the relative change of adjacent pixels for that row.

The following is an example algorithm for calculating the stretch factor for each row of the image:

```
significant_change = dt
For I 0 -> height:
    sum_row_change = 0.0
    row_change_count = 0.0
    For j 0 -> width-1:
        change = abs ( image[I,j] – image[I]+1] )
```

```
        if(change >= significant_change) :
            sum_row_change += change
            row_change_count += 1
        row_sf[i] = (sum_row_change ) / (row_change_count
```

When the content is stretched, the difference between adjacent pixels in a row tends to be smaller (i.e., less difference between pixels) than when image content is not stretched. Thus, a stretch factor distribution measures how the per-row stretch factors are distributed in an image. For a 360-degree image encoded using equirectangular projection, if the stretch factor corresponds to a metric that measures adjacent-pixel differences in a row, then the stretch factor is expected to be higher in the middle rows of the image than in the upper row (or band of rows) and the lower row (or band of rows). Graphically, plotting the row number on the x axis and expected stretch factor on the y axis may result in a pyramidal shape or a gaussian-type shape.

The following is an example algorithm for initializing the expected stretch factors for each row of an input image:

```
        Initial_step = (− 1/1100) * image_height + 4.7
        expected_sf_slope = 1 /* 1 is */
        step_size = t
        For I 0 -> height:
            For j 0 -> step_size:
                left_index = i * step_size + j
                right_index = (height − 1) − left_index
                if(left_index <= right_index) :
                    expected_sf [left_index] = initial_step * i *
                    expected_sf_slope + initial_step
                    expected_sf [right_index] = initial_step * i *
                    expected_sf_slope + initial_step
```

The distribution of actual stretch factors for an image and the distribution of expected stretch factors may be compared to determine a confidence score associated with the stretch factors, where the confidence score is used to determine an overall confidence level that the image is encoded using equirectangular projection, as described more fully below. The confidence score for the stretch factor distribution may be based on weighted scores of the upper band of rows, the lower band of rows, and the remaining rows in the image. For example, each of these sets of rows may be given equal weight when determining a stretch factor distribution confidence score.

The following is an example algorithm for determining the confidence score for the stretch factor distribution:

```
/*stretch zone: first n rows and last n rows where we expect the
stretch-factor distribution to berelatively higher*/
    stretch_zone_size = n
    row_sf_confidence = 0.0
    For I 0 -> height−1:
        index_confidence = 0.0
        weight = None
        if( I is in stretch_zone):
            if(expected_sf[i] >= row_sf[i]):
                weight = 1
            else:
                weight = expected_sf[i] / row_sf[i]
                ngtv_factor = −1 if (row_sf[i] > initial_step) else 1
            index_confidence[i] = (2/3) * (1/2* stretch_zone_size ) *
            weight * ngtv_factor
        else:
            if(expected_sf[i] >= row_sf[i]):
                weight = row_sf[i] / expected_sf[i]
                ngtv_factor = −1 if (row_sf[i] < initial_step) else 1
            else:
                weight = 1
            index_confidence[i] = (1/3) * (1/(height−(2 *
            stretch_zone_size ))) * weight * ngtv_factor
        row_sf_confidence += index_confidence[i]
```

Step 130 of the example method of FIG. 1 includes determining, from the image file, an edge similarity that represents a change between pixels in a first column and pixels in a last column. For example, the algorithm may access the first column (e.g., the leftmost column) and the last column (e.g., the rightmost column) of pixels, and compare the pixel similarity between those two columns. The first column and the last column may, in particular embodiments, refer to a first band of columns and a last band of columns; however, particular embodiments may consider only the first column and the last column (e.g., the first and last bands each contain only one column of pixels). The pixel similarity may be based on the corresponding pixels in each column, i.e., the first pixel (first-row pixel) in the first column is compared to the first pixel in the last column, the second pixel in the first column is compared to the second pixel in the last column, and so on. As discussed above, pixel similarity may be based on, e.g., the difference in RGB values specifying the respective pixels.

The following is an example algorithm for determining the edge similarity scores for an input image:

```
    For I 0->height−1:
        change=abs (image[I,0]−image[I, width−1])
        sum_change+=change
        if(I>0):
            col_0_change=abs (image[I,0]−image[i−1,0])
            col_end_change=abs (image[I, width−1]−image[i−
            1, width−1])
            sum_col_0_change+=col_0_change
            sum_col_end_change+=col_end_change
    Edge_similarity=sum_change/height
    Col_0_uniqueness=sum_col_0_change/height
    Col_end_uniqueness=sum_col_end_change/height
```

Step 140 of the method of FIG. 1 includes determining, based on the stretch factor and on the edge similarity, whether the 360-degree image was encoded using an equirectangular projection. For example, the determination of step 140 may be based on a confidence level that the image file was encoded using an equirectangular projection. The confidence level may be based on a combination of the stretch factors and the edge similarity; e.g., may be a sum of those two metrics. In particular embodiments, the confidence level may be determined based on a weighted combination of the stretch factors and the edge similarity. For example, the stretch factor distribution confidence score may be given twice the weight (e.g., 2/3) that the edge similarity score is given (e.g., 1/3). The confidence level may be a measure from 0 (low confidence) to 100 (completely confident) that the image was encoded using equirectangular projection. The confidence level may be compared to a threshold that determines whether a player will use settings corresponding to equirectangular projection, and this threshold value may set by a player, by a user, etc.

The following is an example algorithm for determining the confidence level that an image was encoded using equirectangular projection:

```
    Edge_diff_low=lDiff
    Edge_diff_high−lHigh
```

Edge_similarity_percent=distribute Edge_similarity b/w (Edge_diff_high, Edge_diff_low)
Edge_similarity_percent=clamp(Edge_similarity_percent)
Edge_similarity_prediction=(1/3*Edge_similarity_paercent)/100
Row_sf_prediction=((2/3)*row_sf_confidence*100)/100
Final_confidence=Row_sf_prediction+Edge_similarity_prediction In particular embodiments, the method of FIG. 1 may be used with a set of images, such as images in a 360-degree video. A player (or other device executing the method of FIG. 1) may perform the example process of FIG. 1 for each image in the set of images to determine whether that image was encoded using an equirectangular projection. In particular embodiments, the set of images may be a random sample of the images that make up the 360-degree video. In particular embodiments, a player may determine whether a video as a whole was encoded using an equirectangular projection based on the determinations for the set of images. For example, if 10 images are randomly sampled, then the method of FIG. 1 may be performed on each image. If the percent of images determined to be encoded using equirectangular projection is greater than an overall threshold (e.g., if the percent of images having a confidence level greater than the confidence threshold is greater than the overall threshold), then the player may determine that the video was encoded using equirectangular projection. In particular embodiments, whether a set of images meets an overall threshold may be determined based on a weighted combination of the confidence levels for each image, e.g., the confidence levels may be summed to determine whether the overall threshold is met.

Step 150 of the example method of FIG. 1 includes responsive to determining that the 360-degree image was encoded using an equirectangular projection, then rendering the 360-degree image based on the equirectangular-projection encoding. For instance, a media player may decode image content based on the determined equirectangular projection. The image may then be presented to a user on an associated display (e.g., on a TV, a smartphone, a wearable, a head-worn XR device, etc.).

Figure 2:
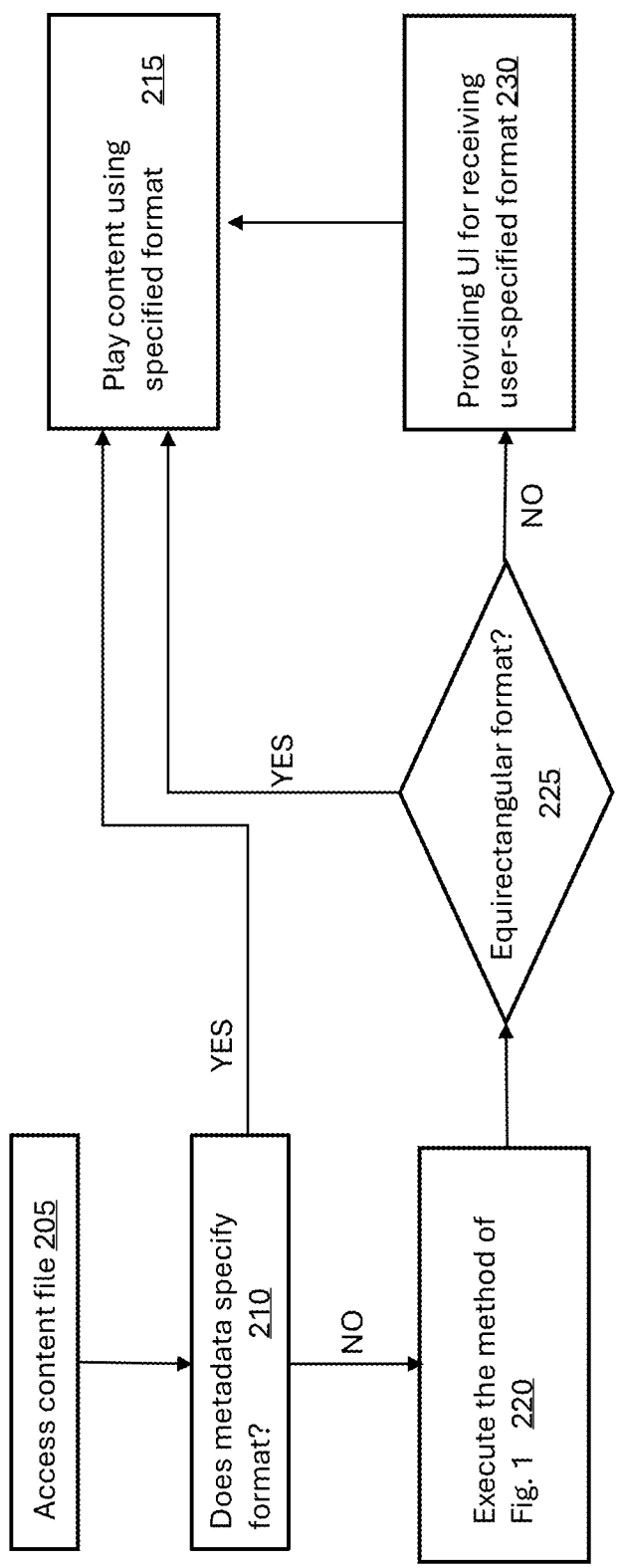
FIG. 2 illustrates an example procedure that uses the example method of FIG. 1 to determine whether 360-degree image content is encoded using equirectangular projection.

FIG. 2 illustrates an example procedure that uses the example method of FIG. 1 to determine whether 360-degree image content (e.g., an image, a video, etc.) is encoded using equirectangular projection. The procedure of FIG. 2 may be performed by a media player, e.g., of a smartphone, a TV, a tablet, a personal computer, or any other suitable electronic device.

At step 205, the player accesses a content file. The content file may be accessed from the storage of a device that hosts the player, may be accessed from another device, or may be accessed by receiving the content file, e.g., during a media streaming session. At step 210, the player determines whether metadata specifies the encoded format of the media content. If yes, then the player plays the content using the specified format at step 215. If not, as is typically the case, then the media player executes the example method of FIG. 1 at steps 220 and 225 to determine whether the 360-degree image content is encoded using equirectangular projection. If yes, then the player plays the media content at step 215 using the specified (determined) equirectangular projection format. If not, then at step 230, the media player can provide a user interface (UI) for a user to provide user input specifying the format, and then can play the content according to the user-specified format.

Figure 3:
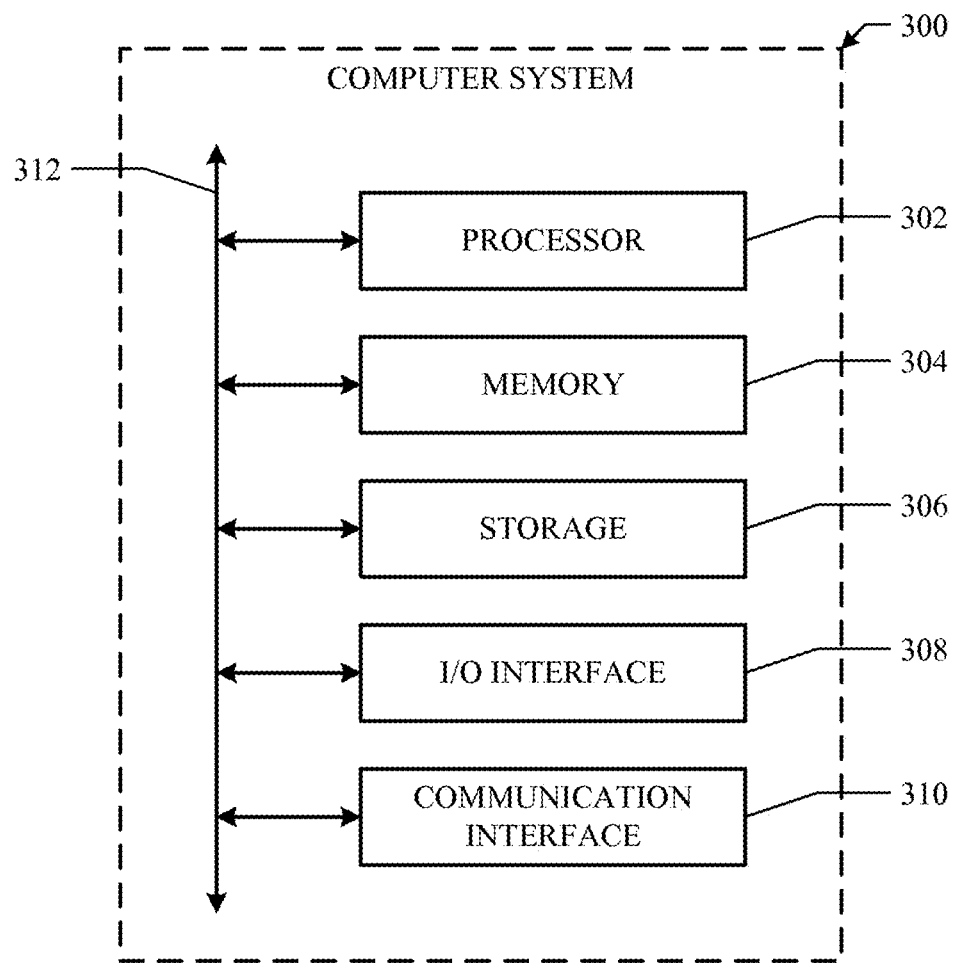
FIG. 3 illustrates an example computing system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   accessing an image file representing a 360-degree image of a scene;
   determining, from the image file, a stretch factor comprising a relative change of adjacent pixels in at least one of (1) an upper row of pixels or (2) a lower row of pixels;
   determining, from the image file, an edge similarity comprising a change between pixels in a first column and pixels in a last column;
   determining, based on the stretch factor and on the edge similarity, whether the 360-degree image was encoded using an equirectangular projection; and
   responsive to determining that the 360-degree image was encoded using an equirectangular projection, rendering the 360-degree image based on the equirectangular-projection encoding.

2. The method of claim 1, wherein the stretch factor comprises either of (1) a mean change of adjacent pixels or (2) a median change of adjacent pixels.

3. The method of claim 1, wherein the edge similarity comprises a mean change between pixels.

4. The method of claim 1, further comprising determining a confidence level that the 360 image was encoded using the equirectangular projection.

5. The method of claim 4, further comprising determining, based on the stretch factor, a stretch-factor distribution.

6. The method of claim 5, wherein the confidence level is based on a weighted combination of the stretch factor distribution and the edge similarity.

7. The method of claim 6, wherein the weighted combination comprises a weighted sum.

8. The method of claim 7, wherein the stretch factor distribution is weighted twice as much as the edge similarity.

9. The method of claim 6, wherein the stretch factor distribution is determined based on a weighted combination of (1) a stretch factor associated with the upper row of pixels (2) a stretch factor associated with the lower row of pixels and (3) a stretch factor associated with a remaining row of pixels.

10. The method of claim 1, wherein one or more of: the upper row of pixels comprises a plurality of upper rows and the lower row of pixels comprises a plurality of lower rows.

11. The method of claim 1, wherein the 360-degree image comprises an image frame of a 360-degree video comprising a plurality of 360-degree image frames.

12. The method of claim 11, further comprising:
   sampling from the plurality of 360-degree image frames;
   determining, for each sampled 360-degree image frame, a respective stretch factor and edge similarity; and
   determining, based on the stretch factor and the edge similarity for the sampled 360-degree images frames, whether the 360-degree video was encoded using an equirectangular projection.

13. One or more non-transitory computer readable storage media storing instructions that are operable when executed to:
   access an image file representing a 360-degree image of a scene;
   determine, from the image file, a stretch factor comprising a relative change of adjacent pixels in at least one of (1) an upper row of pixels and (2) a lower row of pixels;
   determine, from the image file, an edge similarity comprising a change between pixels in a first column and pixels in a last column;
   determine, based on the stretch factor and on the edge similarity, whether the 360-degree image was encoded using an equirectangular projection; and
   responsive to determining that the 360-degree image was encoded using an equirectangular projection, render the 360-degree image based on the equirectangular-projection encoding.

14. The media of claim 13, wherein the instructions are further operable when executed to determine a confidence level that the 360 image was encoded using the equirectangular projection.

15. The media of claim 14, wherein the instructions are further operable when executed to determine, based on the stretch factor, a stretch-factor distribution.

16. The media of claim 13, wherein the 360-degree image comprises an image frame of a 360-degree video comprising a plurality of 360-degree image frames.

17. A system comprising:
one or more non-transitory computer readable storage media storing instructions; and one or more processors coupled to the one or more non-transitory computer readable storage media and operable to execute the instructions to:
access an image file representing a 360-degree image of a scene;
determine, from the image file, a stretch factor comprising a relative change of adjacent pixels in at least one of (1) an upper row of pixels and (2) a lower row of pixels;
determine, from the image file, an edge similarity comprising a change between pixels in a first column and pixels in a last column;
determine, based on the stretch factor and on the edge similarity, whether the 360-degree image was encoded using an equirectangular projection; and
responsive to determining that the 360-degree image was encoded using an equirectangular projection, render the 360-degree image based on the equirectangular-projection encoding.

18. The system of claim 17, further comprising one or more processors that are operable to execute the instructions to determine a confidence level that the 360 image was encoded using the equirectangular projection.

19. The system of claim 18, further comprising one or more processors that are operable to execute the instructions to determine, based on the stretch factor, a stretch-factor distribution.

20. The system of claim 17, wherein the 360-degree image comprises an image frame of a 360-degree video comprising a plurality of 360-degree image frames.

\* \* \* \* \*